(12) United States Patent
Bian

(10) Patent No.: US 12,332,483 B2
(45) Date of Patent: Jun. 17, 2025

(54) PHOTONICS STRUCTURES WITH STACKED RING RESONATORS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 134 days.

(21) Appl. No.: 17/830,432

(22) Filed: Jun. 2, 2022

(65) Prior Publication Data
US 2023/0393341 A1    Dec. 7, 2023

(51) Int. Cl.
| G02B 6/30 | (2006.01) |
| G02B 6/12 | (2006.01) |
| G02B 6/122 | (2006.01) |
| G02B 6/136 | (2006.01) |

(52) U.S. Cl.
CPC ......... *G02B 6/305* (2013.01); *G02B 6/12004* (2013.01); *G02B 6/1228* (2013.01); *G02B 6/136* (2013.01); *G02B 2006/12061* (2013.01); *G02B 2006/12147* (2013.01)

(58) Field of Classification Search
CPC .. G02B 6/305; G02B 6/12004; G02B 6/1228; G02B 6/136; G02B 2006/12061; G02B 2006/12147; G02B 6/12007; G02B 6/29335; G02B 6/12002
USPC .......... 385/11, 16, 17, 24, 26–28, 30, 32, 40
See application file for complete search history.

(56) References Cited

U.S. PATENT DOCUMENTS

| 4,630,885 A | * | 12/1986 | Haavisto | G01C 19/727 |
| | | | | 385/39 |
| 6,411,752 B1 | | 6/2002 | Little et al. | |
| 6,865,314 B1 | * | 3/2005 | Blair | G02B 6/12007 |
| | | | | 385/27 |
| 9,081,252 B2 | * | 7/2015 | Aflatouni | G02F 1/025 |
| 9,086,387 B2 | | 7/2015 | Assefa et al. | |
| 9,829,635 B2 | * | 11/2017 | Tu | G02B 6/29341 |
| 10,126,500 B2 | * | 11/2018 | Qi | G02B 6/1228 |
| 10,816,726 B1 | | 10/2020 | Peng et al. | |
| 11,029,465 B1 | | 6/2021 | Rakowski et al. | |
| 12,038,615 B2 | * | 7/2024 | Bian | G02B 6/1228 |
| 12,147,075 B2 | * | 11/2024 | Bian | G02B 6/4214 |
| 2003/0058908 A1 | * | 3/2003 | Griffel | H01S 5/1032 |
| | | | | 372/43.01 |

(Continued)

FOREIGN PATENT DOCUMENTS

WO    2021066721 A1    4/2021

OTHER PUBLICATIONS

European Patent Office, Extended European Search Report and Written Opinion issued in European Patent Application No. 22200734.6 on May 30, 2023 (10 pages).

(Continued)

*Primary Examiner* — Rhonda S Peace
(74) *Attorney, Agent, or Firm* — Thompson Hine LLP; Anthony Canale

(57) ABSTRACT

Structures including a ring resonator and methods of fabricating a structure including a ring resonator. The structure comprises an optical component, a first ring resonator positioned adjacent to the optical component, and a second ring resonator spaced in a vertical direction from the first ring resonator. The first ring resonator and the second ring resonator have an overlapping relationship.

20 Claims, 11 Drawing Sheets

(56) References Cited

U.S. PATENT DOCUMENTS

| | | | | |
|---|---|---|---|---|
| 2006/0078254 | A1* | 4/2006 | Djordjev | G02B 6/12007 385/32 |
| 2009/0185803 | A1* | 7/2009 | Uemura | G02B 6/12007 398/43 |
| 2011/0200286 | A1* | 8/2011 | Smith | G02B 6/3897 385/86 |
| 2014/0023327 | A1* | 1/2014 | Smith | G02B 6/4434 385/86 |
| 2016/0291251 | A1* | 10/2016 | Tu | G02B 6/29395 |
| 2017/0219776 | A1* | 8/2017 | Timurdogan | G02B 6/29338 |
| 2021/0278611 | A1 | 9/2021 | Sahin et al. | |
| 2022/0043207 | A1 | 2/2022 | Bian | |
| 2023/0244030 | A1* | 8/2023 | Bian | G02B 6/13 385/30 |
| 2023/0393341 | A1* | 12/2023 | Bian | G02B 6/29335 |
| 2024/0004137 | A1* | 1/2024 | Cheng | G02B 6/12004 |

OTHER PUBLICATIONS

Jonathan T. Bessette and Donghwan Ahn, "Vertically stacked microring waveguides for coupling between multiple photonic planes," Optics Express 21, 13580-13591 (2013).

Hah, Dooyoung, "Analysis of optical gyroscopes with vertically stacked ring resonators." Turkish Journal of Electrical Engineering & Computer Sciences. 1554-1564. 10.3906/elk-2007-93 (2021).

Amemiya, Yoshiteru et al., "Multi-slot stack-type ring resonator for high sensitivity biosensor and low voltage optical modulator." IEEE International Conference on Group IV Photonics GFP. 9-10. 10.1109/Group4.2013.6644464 (2013).

Brian Stern, Xingchen Ji, Avik Dutt, and Michal Lipson, "Compact narrow-linewidth integrated laser based on a low-loss silicon nitride ring resonator," Opt. Lett. 42, 4541-4544 (2017).

Arash Hosseinzadeh and Christopher T. Middlebrook, "Highly linear dual ring resonator modulator for wide bandwidth microwave photonic links," Opt. Express 24, 27268-27279 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optica Publishing Group, 2020), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," 2021 Optical Fiber Communications Conference and Exhibition (OFC), pp. 1-3 (2021).

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3 (2020).

Y. Bian et al., "3D silicon photonic interconnects and integrated circuits based on phase matching," 2021 IEEE 71st Electronic Components and Technology Conference (ECTC), pp. 2279-2284, doi: 10.1109/ECTC32696.2021.00357 (2021).

Bian, Yusheng et al., "Edge Couplers in the Back-End-Of-Line Stack of a Photonics Chip" filed on Jan. 19, 2021 as a U.S. Appl. No. 17/151,955.

Bian, Yusheng et al., "Edge Couplers Integrated With Dual Ring Resonators" filed on Jan. 31, 2022 as a U.S. Appl. No. 17/588,470.

Dezfulian, Kevin K. et al., "Hybrid Edge Couplers With Layers in Multiple Levels" filed on Feb. 8, 2021 as a U.S. Appl. No. 17/169,971.

Bartlomiej Jan Pawlak, "Photonics Chips and Semiconductor Products Having Angled Optical Fibers" filed on Oct. 25, 2021 as a U.S. Appl. No. 17/510,329.

Bian, Yusheng, "Edge Couplers With Metamaterial Rib Features" filed on Jul. 7, 2021 as a U.S. Appl. No. 17/369,253.

Bian, Yusheng et al., "Spot-Size Converters With Angled Facets" filed on Feb. 24, 2022 as a U.S. Appl. No. 17/679,188.

Sahin, Asli et al., "Photonics Integrated Circuit With Silicon Nitride Waveguide Edge Coupler" filed on Feb. 19, 2021 as a U.S. Appl. No. 17/179,532.

Bian, Yusheng et al., "Optical Components in the Back-End-Of-Line Stack of a Photonics Chip" filed on Jan. 12, 2021 as a U.S. Appl. No. 17/146,864.

Bian, Yusheng et al., "Edge Couplers in the Back-End-Of-Line Stack of a Photonic Chip Having a Sealed Cavity" filed on Apr. 11, 2022 as a U.S. Appl. No. 17/658,821.

* cited by examiner

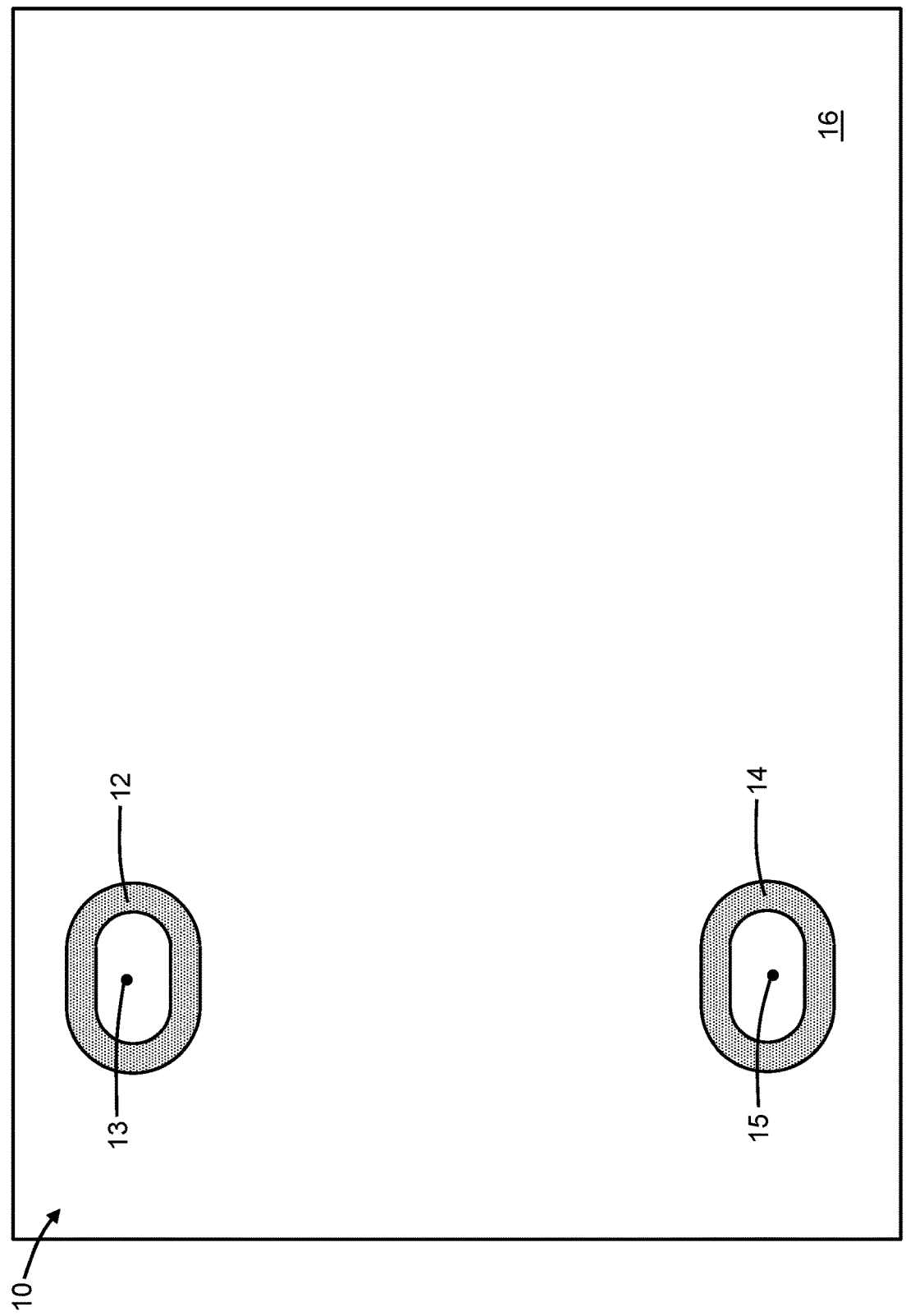

PHOTONICS STRUCTURES WITH STACKED RING RESONATORS

BACKGROUND

The disclosure relates to photonics chips and, more specifically, to structures including a ring resonator and methods of fabricating a structure including a ring resonator.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, near an edge of a photonics chip to optical components on the photonics chip. The edge coupler supports mode transformation and mode size variation associated with mode conversion when light is transferred from the light source to the edge coupler. The light received by the edge coupler may be characterized by a transverse electric polarization or by a transverse magnetic polarization, which are indistinguishable from each other based on, for example, differences in insertion loss.

Improved structures including a ring resonator and methods of fabricating a structure including a ring resonator are needed.

SUMMARY

In an embodiment of the invention, a structure comprises an optical component, a first ring resonator positioned adjacent to the optical component, and a second ring resonator spaced in a vertical direction from the first ring resonator. The first ring resonator and the second ring resonator have an overlapping relationship.

In an embodiment of the invention, a method comprises forming an optical component, forming a first ring resonator positioned adjacent to the optical component, and forming a second ring resonator spaced in a vertical direction from the first ring resonator. The first ring resonator and the second ring resonator are formed with an overlapping relationship.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 6 is a top view of a structure at an initial fabrication stage of a processing method in accordance with alternative embodiments of the invention.

DETAILED DESCRIPTION

Figure 1:
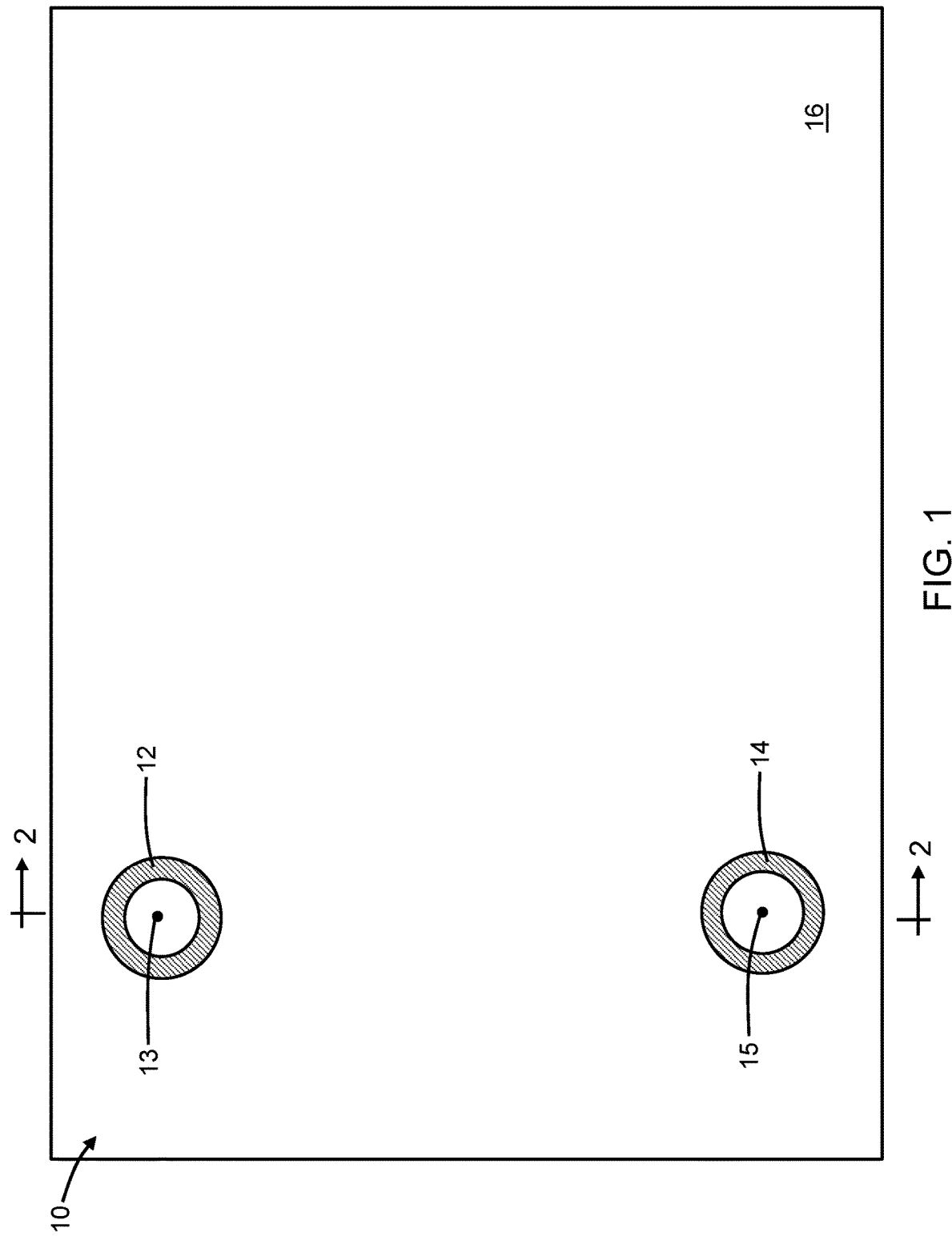
FIG. 1 is a top view of a structure at an initial fabrication stage of a processing method in accordance with embodiments of the invention.
Figure 2:
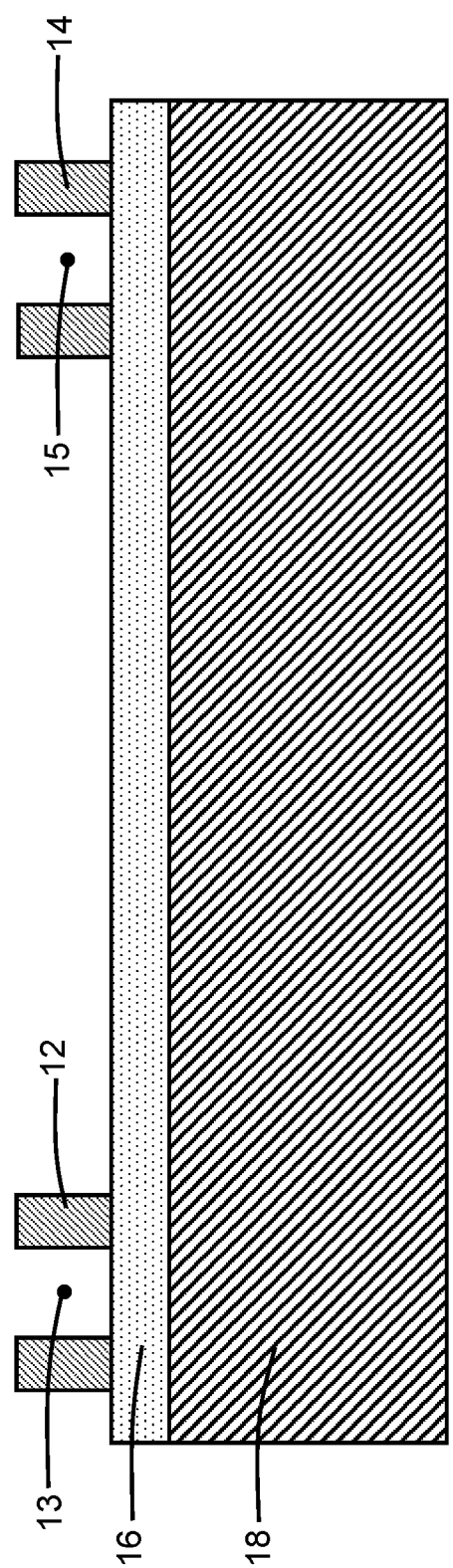
FIG. 2 is a cross-sectional view of the structure taken generally along line 2-2 in FIG. 1.

With reference to FIGS. 1, 2 and in accordance with embodiments of the invention, a structure 10 for a photonics chip includes a ring resonator 12 and a ring resonator 14 positioned adjacent to the ring resonator 12. The ring resonators 12, 14 may be positioned over a dielectric layer 16. In an embodiment, the dielectric layer 16 may be comprised of a dielectric material, such as silicon dioxide, that is an electrical insulator. In an embodiment, the dielectric layer 16 may be a buried oxide layer of a silicon-on-insulator substrate, and the silicon-on-insulator substrate may further include a substrate 18 comprised of a semiconductor material (e.g., single-crystal silicon) beneath the buried oxide layer.

In an embodiment, the ring resonators 12, 14 may be closed loops or rings. In an embodiment, the ring resonator 12 may be an annular waveguide core that is bounded by concentric inner and outer ring-shaped edges that are centered on a center point 13. In an embodiment, the ring resonator 14 may be an annular waveguide core that is bounded by concentric inner and outer circular edges that are centered on a center point 15.

In an embodiment, the ring resonators 12, 14 may be comprised of a semiconductor material, such as single-crystal silicon or polysilicon. In an embodiment, the ring resonators 12, 14 may be concurrently formed by patterning a single-crystal silicon device layer of a silicon-on-insulator substrate with lithography and etching processes. In an alternative embodiment, the ring resonators 12, 14 may be comprised of a dielectric material, such as silicon nitride.

Figure 3:
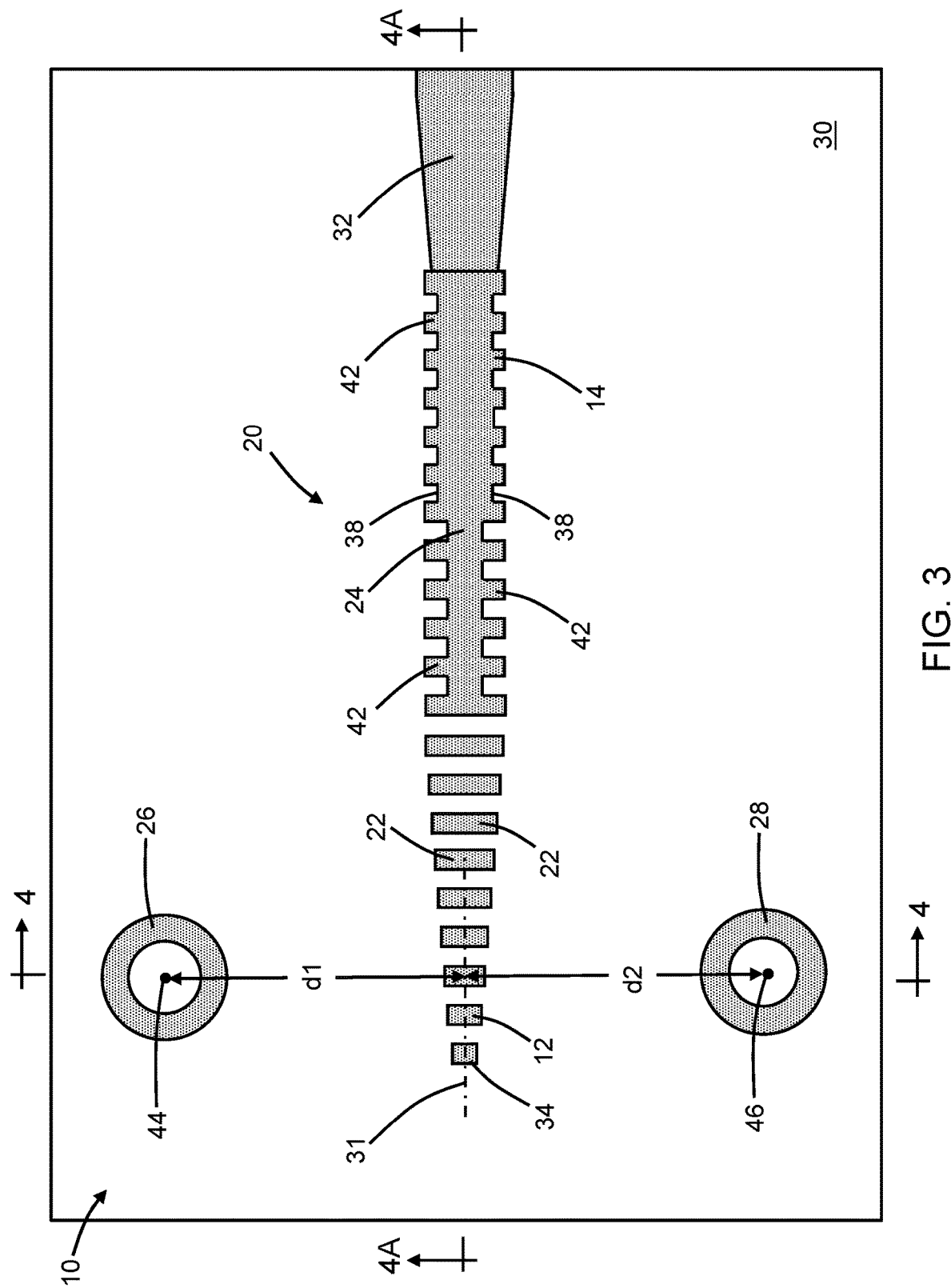
FIG. 3 is a top view of the structure at a fabrication stage subsequent to FIG. 1.
Figure 4:
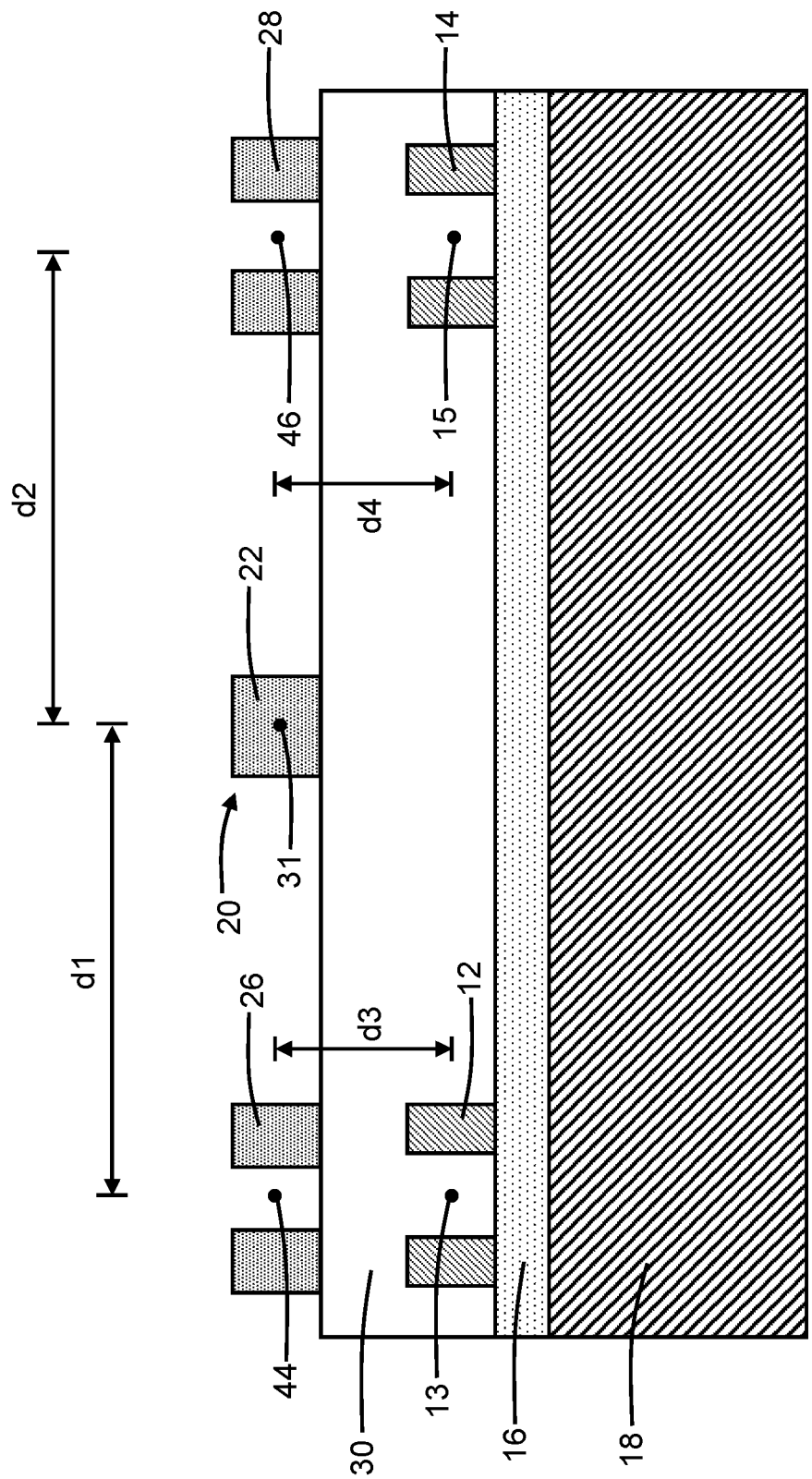
FIG. 4 is a cross-sectional view of the structure taken generally along line 4-4 in FIG. 3.
Figure 4A:
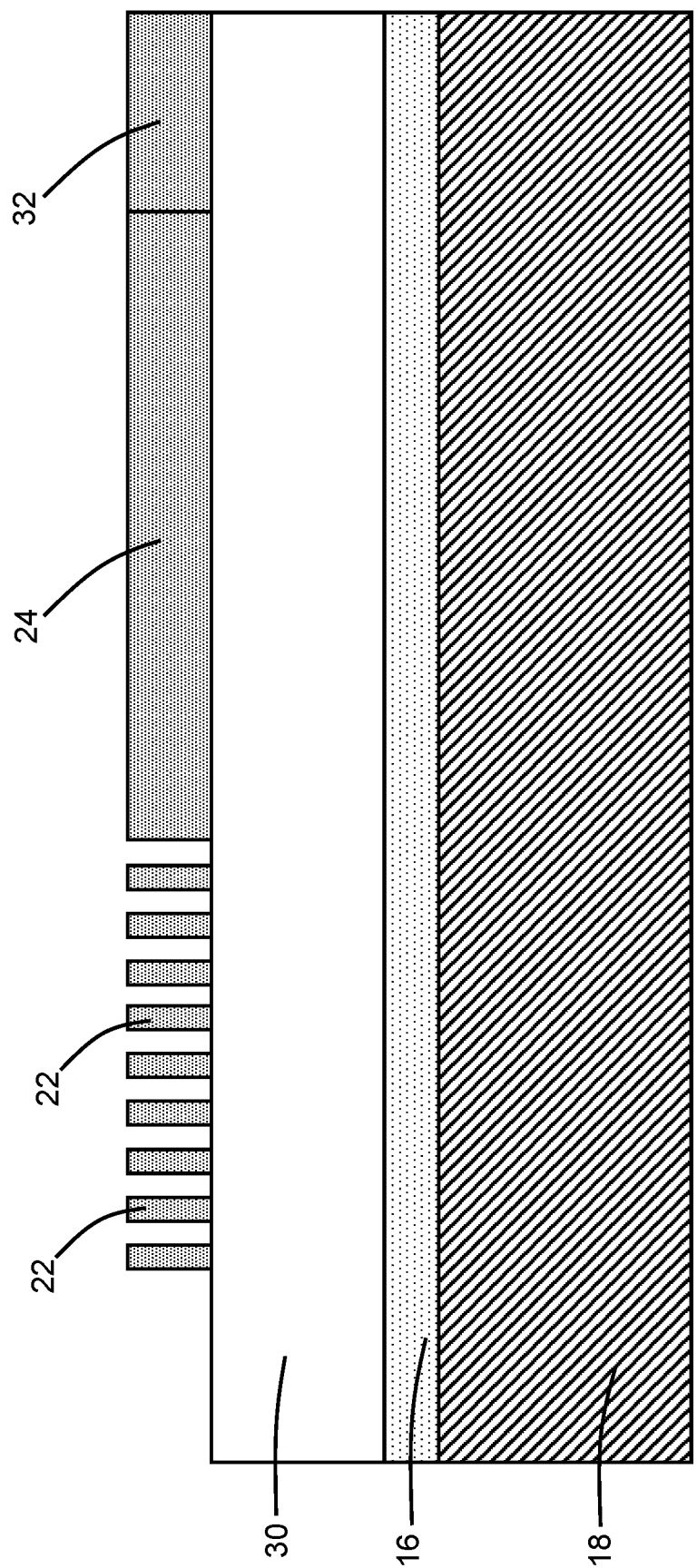
FIG. 4A is a cross-sectional view of the structure taken generally along line 4A-4A in FIG. 3.

With reference to FIGS. 3, 4, 4A in which like reference numerals refer to like features in FIGS. 1, 2 and at a subsequent fabrication stage, a dielectric layer 30 is formed over the ring resonators 12, 14. The dielectric layer 30 may be comprised of a dielectric material, such as silicon dioxide. The thickness of the dielectric layer 30 may be greater than the height of the ring resonators 12, 14 such that the ring resonators 12, 14 are embedded in the dielectric layer 30. The refractive index of the dielectric material constituting the dielectric layer 30 may be less than the refractive index of the material constituting the ring resonators 12, 14.

The structure 10 further includes a ring resonator 26, a ring resonator 28, and an optical component in the form of an edge coupler 20 that are formed on the dielectric layer 30. The edge coupler 20 may include a waveguide core 24 and multiple segments 22 that are positioned in a row adjacent to the waveguide core 24. The segments 22 and the waveguide core 24 are aligned along a longitudinal axis 31 with the segments 22 positioned in a spaced arrangement in which adjacent pairs of segments 22 are separated by a gap. One of segments 22 terminates the edge coupler 20 to define a facet 34. The segments 22 may increase in width with increasing distance from the facet 34 to define an inverse taper characterized by a gradual width increase along a mode propagation direction. The waveguide core 24 includes opposite notched sidewalls 38 having a series of outwardly-extending projections 42 and notches defining gaps between adjacent pairs of the projections 42. The waveguide core 24 is connected to a waveguide core 32 that guides light from the edge coupler 20 to downstream optical components on the photonics chip.

The segments 22 and projections 42 may be dimensioned and positioned at small enough pitch along the longitudinal axis 31 so as not to radiate or reflect light at the wavelength of operation and, when the gaps are filled by dielectric material, to act as an effective optical material known as a metamaterial. In that regard, the segments 22 and projections 42 may define respective sub-wavelength gratings.

In alternative embodiments, the edge coupler 20 may be modified to have a different construction. For example, the segments 22 and waveguide core 24 may be collectively replaced by an inverse taper or a compound inverse taper. As another example, an inversely-tapered, tapered, or a non-tapered waveguide core section may be overlaid as a rib on the segments 22 such that the segments 22 are connected with each other.

The ring resonator 26 is stacked with the ring resonator 12, and the ring resonator 28 is stacked with the ring resonator 14. In an embodiment, the ring resonator 26 may have the same shape as the ring resonator 12, and the ring resonator 28 may have the same shape as the ring resonator 14. In an embodiment, the ring resonators 26, 28 may be closed loops or rings similar to the ring resonators 12, 14. In an embodiment, the ring resonator 26 may be an annular waveguide core that is bounded by concentric inner and outer ring-shaped edges that are centered on a center point 44. In an embodiment, the ring resonator 28 may be an annular waveguide core that bounded by concentric inner and outer circular edges that are centered on a center point 46.

The ring resonators 26, 28 are positioned in a vertical direction in a different plane or level than the ring resonators 12, 14. In an embodiment, the ring resonator 26 may overlap with the ring resonator 12, and the ring resonator 28 may overlap with the ring resonator 14. In an embodiment, the ring resonator 26 may fully overlap with the ring resonator 12, and the ring resonator 28 may fully overlap with the ring resonator 14. In an embodiment, the ring resonator 26 may be centered over the ring resonator 12 such that the ring resonators 12, 26 are concentric. In an embodiment, the ring resonator 28 may be centered over the ring resonator 14 such that the ring resonators 14, 28 are concentric. In an embodiment, the ring resonator 26 may be wider in a radial direction than the ring resonator 12. In an embodiment, the ring resonator 26 may be wider in a radial direction than the ring resonator 12, and the ring resonator 26 may be concentric with the ring resonator 12. In an embodiment, the ring resonator 28 may be wider in a radial direction than the ring resonator 14. In an embodiment, the ring resonator 28 may be wider in a radial direction than the ring resonator 14, and the ring resonator 28 may be concentric with the ring resonator 14.

The center point 44 of the ring resonator 26 may be spaced or offset in a lateral direction by a perpendicular distance d1 from the longitudinal axis 31 of the edge coupler 20. The center point 44 of the ring resonator 26 may be spaced or offset in a vertical direction by a perpendicular distance d3 from the center point 13 of the ring resonator 12. The center point 46 of the ring resonator 28 may be laterally spaced or offset by a perpendicular distance d2 from the longitudinal axis 31 of the edge coupler 20. The center point 46 of the ring resonator 28 may be spaced or offset in a vertical direction by a perpendicular distance d4 from the center point 15 of the ring resonator 14. The lateral and vertical offsets of the ring resonators 12, 14 result in respective diagonal offsets each characterized by a diagonal distance for the offset relative to the longitudinal axis 31 of the edge coupler 20. The diagonal distances may be greater than the perpendicular distances d1, d2.

In the representative embodiment, the edge coupler 20 is positioned in a lateral direction between the stacked ring resonators 12, 26 and the stacked ring resonators 14, 28. In an embodiment, the perpendicular distance d1 and the perpendicular distance d2 may be equal such that the edge coupler 20 is symmetrically positioned between the ring resonator 12 and the ring resonator 14.

The perpendicular distances d1, d2 separating the ring resonators 26, 28 from the edge coupler 20 and the diagonal distances separating the ring resonators 12, 14 from the edge coupler 20 are selected such that the insertion loss is not significantly increased by their introduction. For example, the perpendicular distances d1, d2 may be on the order of the mode size of the light received by the edge coupler 20 to ensure weak optical coupling. In an embodiment, the perpendicular distances d1, d2 may be greater than or equal to 5 microns. Most of the received light continues to propagate unimpeded through the edge coupler 20 and to the waveguide core 32 due to the minimal impact on insertion loss. Symmetrical positioning of the ring resonators 26, 28 relative to the edge coupler 20, as well as symmetrical positioning of the ring resonators 12, 14 relative to the edge coupler 20, may also reduce the insertion loss by eliminating directional bias of the light coupling. The relatively-large perpendicular distances between the ring resonators 26, 28 and the edge coupler 20 may also reduce the manufacturing risk presented to the optical path by the introduction of the ring resonators 26, 28.

In an embodiment, the edge coupler 20 and waveguide core 32 may be comprised of a dielectric material, such as silicon nitride. In an embodiment, the edge coupler 20 and waveguide core 32 may be formed by depositing a layer of the dielectric material and patterning the deposited layer with lithography and etching processes. In an embodiment, the ring resonators 26, 28 may be comprised of the same material (e.g., silicon nitride) as the edge coupler 20, and may be patterned concurrently with the edge coupler 20 and waveguide core 32. In an alternative embodiment, the ring resonators 26, 28 may be comprised of a semiconductor material, such as polysilicon. In an alternative embodiment, the edge coupler 20 may be disposed in the same level as the ring resonators 12, 14 and may be comprised of the same material as the ring resonators 12, 14.

In an embodiment, the ring resonators 26, 28 may be comprised of the same material as the ring resonators 12, 14. In an embodiment, the ring resonators 12, 14 and the ring resonators 26, 28 may be comprised of silicon nitride. In an embodiment, the ring resonators 26, 28 may be comprised of a different material than the ring resonators 12, 14. In an embodiment, the ring resonators 12, 14 may be comprised of single-crystal silicon, and the ring resonators 26, 28 may be comprised of silicon nitride. In an embodiment, the ring resonators 12, 14 may be comprised of single-crystal silicon or polysilicon, and the ring resonators 26, 28 may be comprised of polysilicon.

Figure 5:
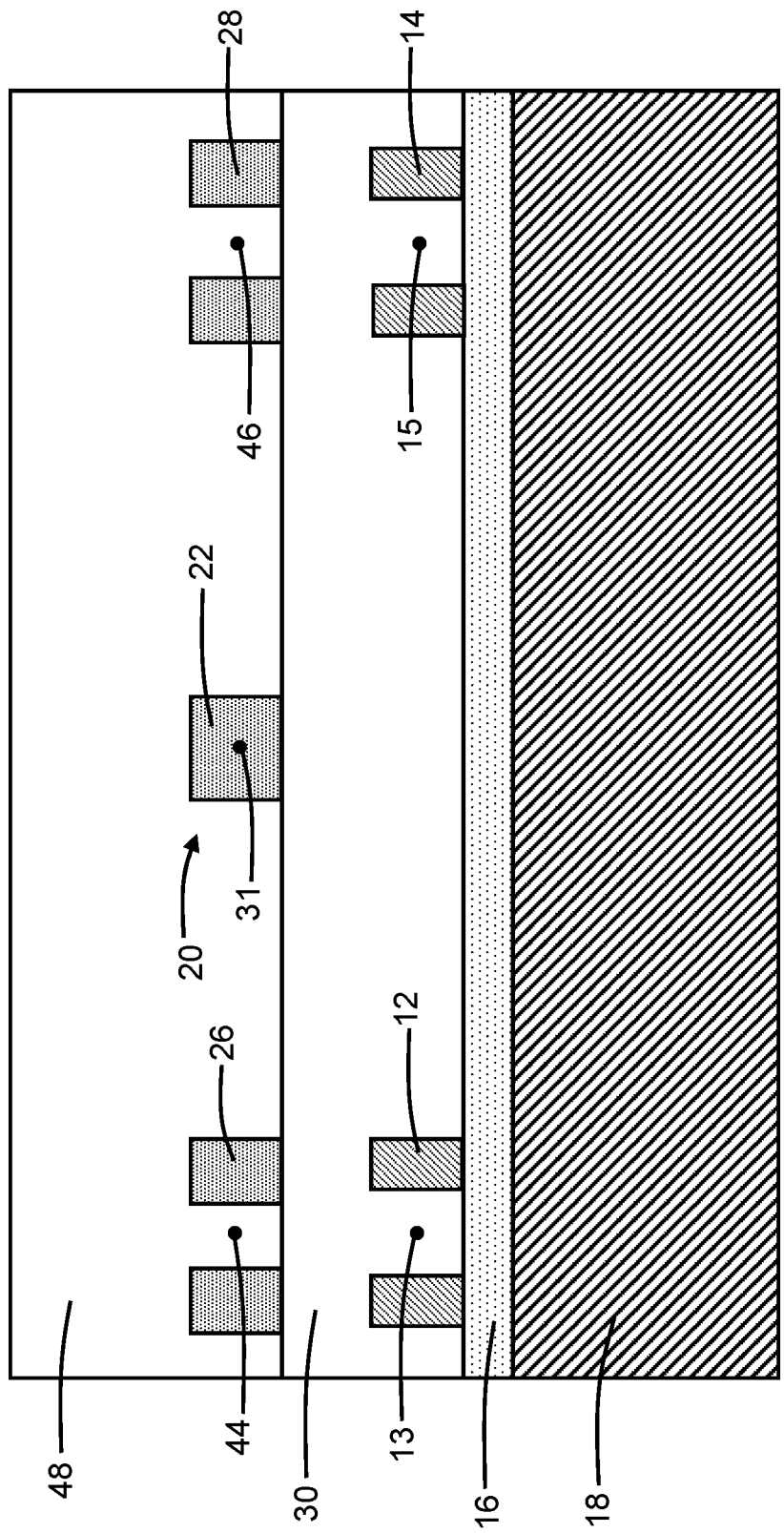
FIGS. 5, 5A are cross-sectional views of the structure at a fabrication stage subsequent to FIGS. 4, 4A.
Figure 5A:
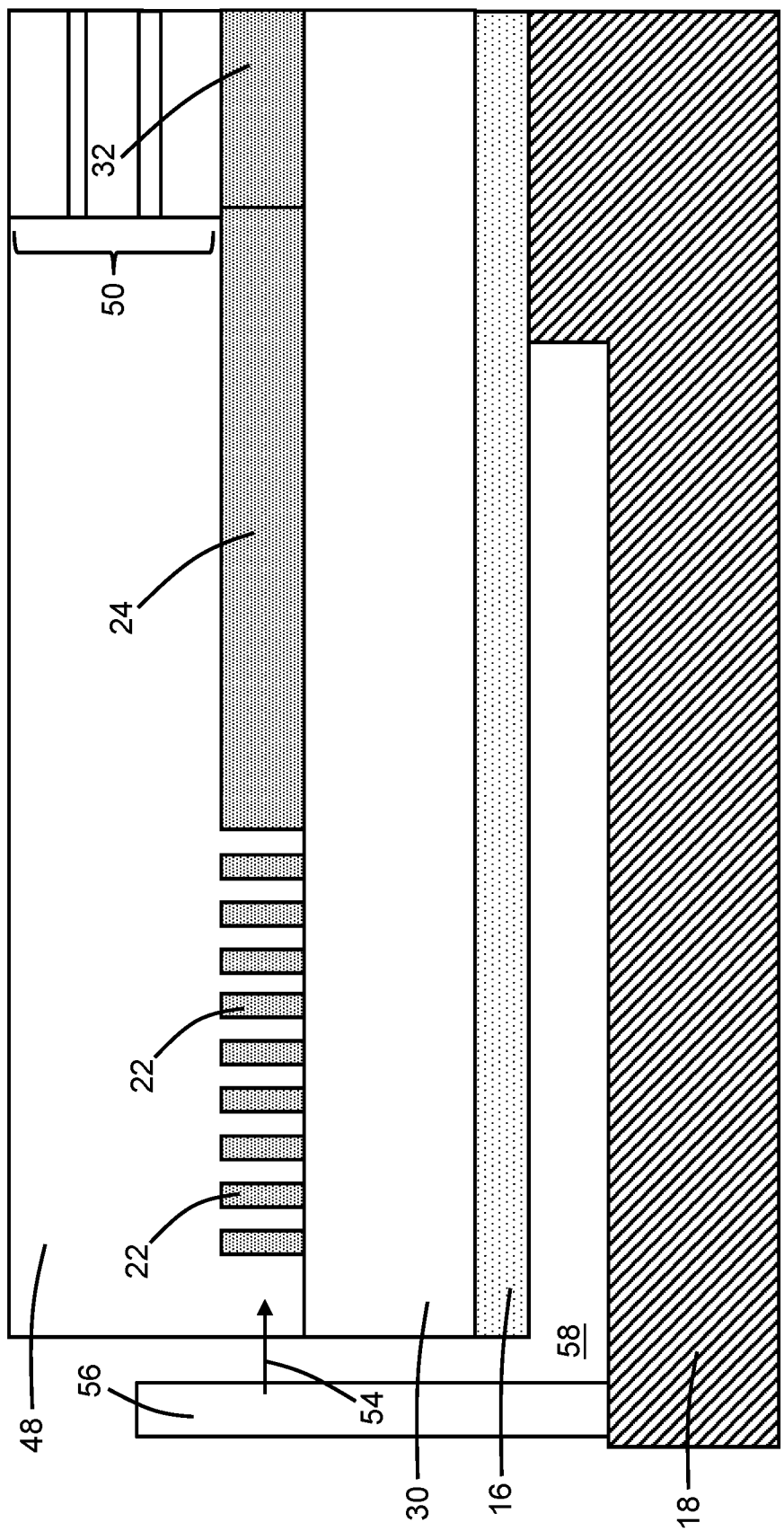

With reference to FIGS. 5, 5A in which like reference numerals refer to like features in FIGS. 4, 4A and at a subsequent fabrication stage, a back-end-of-line stack 50 may be formed that includes stacked dielectric layers each comprised of a dielectric material, such as silicon dioxide, tetraethylorthosilicate silicon dioxide, fluorinated-tetraethylorthosilicate silicon dioxide, or silicon nitride. A section of the back-end-of-line stack 50 may be removed from above the edge coupler 20 and the ring resonators 26, 28, and the removed section may be replaced by a dielectric layer 48 that may be comprised of a homogeneous dielectric material, such as silicon dioxide.

The edge coupler 20 and the ring resonators 26, 28 are embedded in the dielectric layer 48. The dielectric material constituting the dielectric layer 48 may have a refractive index that is less than the refractive index of the material constituting the edge coupler 20 and the ring resonators 26, 28. The dielectric material of the dielectric layer 48 is disposed in the gaps between adjacent pairs of the segments 22 and between adjacent pairs of the projections 42. The segments 22, the projections 42, and the dielectric material of the dielectric layer 48 in the gaps may define a metamaterial structure in which the material constituting the segments 22 and projections 42 has a higher refractive index than the dielectric material of the dielectric layer 48. The metamaterial structure can be treated as a homogeneous medium having an effective refractive index that is intermediate between the refractive index of the material constituting the segments 22 and projections 42 and the refractive index of the dielectric material of the dielectric layer 48.

A light source 56 may be positioned adjacent to the edge coupler 20. The light source 56 may supply light having a given wavelength, intensity, mode shape, and mode size, and the edge coupler 20 may provide spot size conversion for the light. The light source 56 may be positioned in a cavity 58 formed in the substrate 18. The space between the edge coupler 20 and the light source 56 may be filled by air or by an index-matching material, such as an adhesive. In an embodiment, the light source 56 may be a single-mode or multi-mode optical fiber that is positioned in the cavity 58 adjacent to the edge coupler 20. In an embodiment, the cavity 58 may extend as an undercut in the substrate 18 beneath the edge coupler 20. In an alternative embodiment, the light source 56 may be a semiconductor laser positioned adjacent to the edge coupler 20, and the semiconductor laser may be attached inside the cavity 58.

In use, light (e.g., laser light) may be provided from the light source 56 in a mode propagation direction 54 toward the edge coupler 20. A small portion of the light received by the edge coupler 20 will be coupled into the stacked ring resonators 12, 26 and into the stacked ring resonators 14, 28. The ring resonators 12, 26 and the ring resonators 14, 28 are laterally spaced from the edge coupler 20 by sufficient distances such that the light coupling is weak, and the resonance condition is selected such that the light coupling with the ring resonators 12, 26 and the ring resonators 14, 28 is intermittent. The result is a perturbation manifested by intermittent observable dips in light intensity that are superimposed as a ripple on an otherwise constant light intensity. The light intensity may be measured using a photodetector coupled to the waveguide core 32. Cumulatively, the dips in light intensity have negligible impact on the insertion loss because of the weak light coupling, but impart an observable perturbation superimposed on the received light that permits the polarization mode of the light to be sensed. For example, 1 percent or less of the light may be coupled from the edge coupler 20 to the ring resonators 12, 26 and the ring resonators 14, 28.

The ring resonators 12, 26 and the ring resonators 14, 28 are capable of weakly coupling with light of either polarization because of a lack of polarization sensitivity. However, the physical properties (e.g., ring size, perpendicular distances, and other dimensions) of the ring resonators 12, 26 and the ring resonators 14, 28 may be selected such that either light of the transverse electric polarization or light of the transverse magnetic polarization, but not both, exhibits the perturbation. For that reason, the perturbation permits light characterized by the transverse electric polarization and light characterized by the transverse magnetic polarization to be distinguished so that the polarization mode of the light received by the edge coupler 20 is detectable through the presence or absence of dips in light intensity.

With reference to FIG. 6 in which like reference numerals refer to like features in FIG. 1 and in accordance with alternative embodiments of the invention, the shapes of the ring resonators 12, 14 may be altered such that each of the ring resonators 12, 14 14 is non-circular. In an embodiment, the resonators 12, 14 may have a racetrack shape with rounded or curved ends connected by parallel straight sections.

Figure 7:
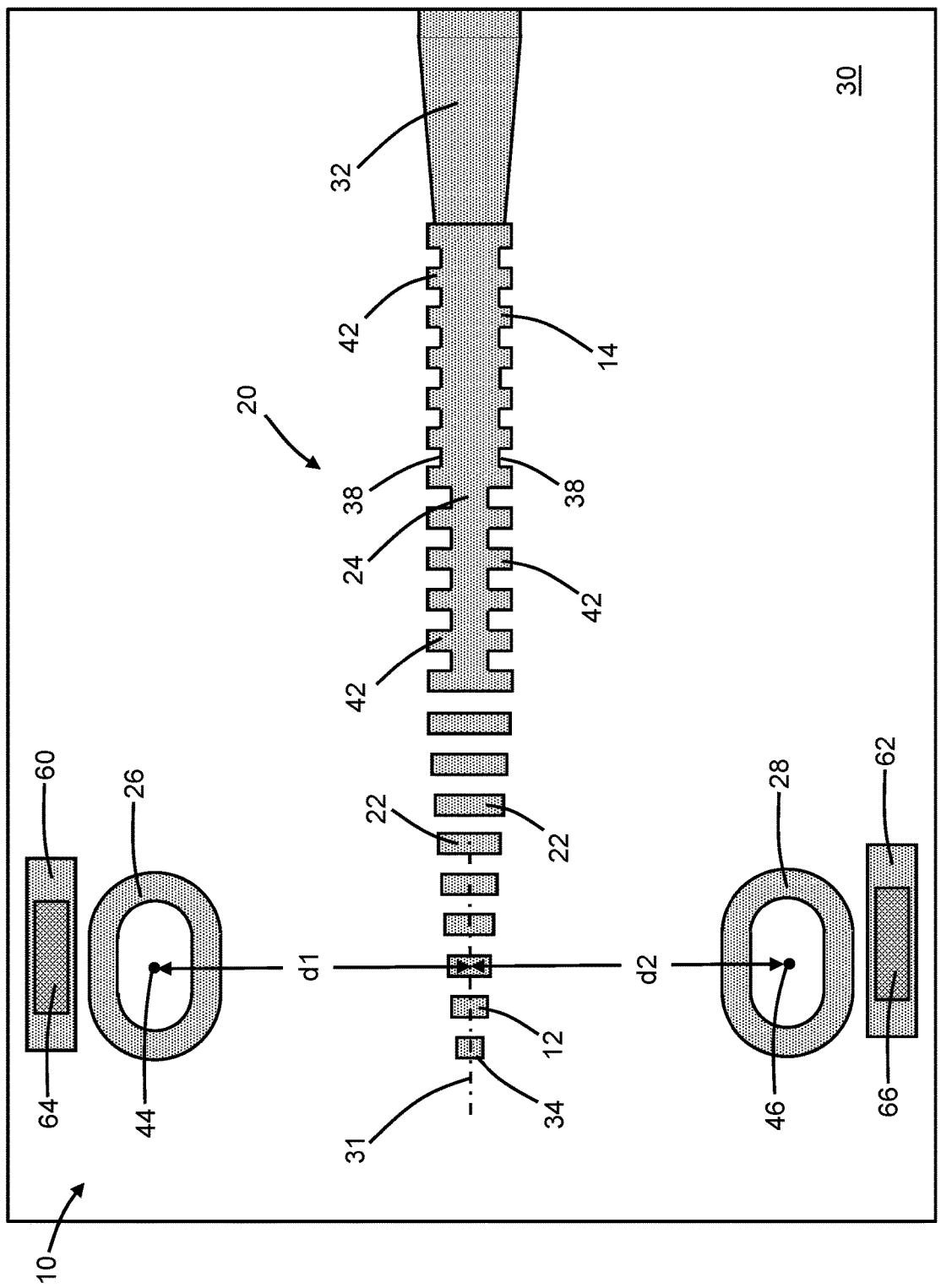
FIG. 7 is a top view of the structure at a fabrication stage subsequent to FIG. 6.

With reference to FIG. 7 in which like reference numerals refer to like features in FIG. 6 and at a subsequent fabrication stage, the shapes of the ring resonators 26, 28 may be altered to match the non-circular shapes of the ring resonators 12, 14. In an embodiment, each of the ring resonators 26, 28 may be modified to be a racetrack waveguide with rounded or curved ends connected by parallel straight sections. The straight sections of the ring resonators 26, 28 nearest to the edge coupler 20 and the straight sections of the ring resonators 12, 14 nearest to the edge coupler 20 may operate to increase the coupling length with the edge coupler 20.

The structure 10 may be further modified to add a waveguide core 60 adjacent to the ring resonator 26, and a waveguide core 62 adjacent to the ring resonator 28. The ring resonator 26 is positioned in a lateral direction between the edge coupler 20 and the waveguide core 60, and the ring resonator 28 is positioned in a lateral direction between the edge coupler 20 and the waveguide core 62. The waveguide cores 60, 62, which may terminate at opposite ends, may be comprised of the same material (e.g., silicon) as the edge coupler 20 and ring resonators 26, 28. The waveguide core 60 may include an absorber 64, and the waveguide core 62 may also include an absorber 66. The absorbers 64, 66 may be comprised of a material, such as germanium, that strongly absorbs light, and the absorbers 64, 66 may be formed in trenches patterned in the respective waveguide cores 60, 62.

The waveguide cores 60, 62 define drop ports in the structure 10. Light that is coupled from the edge coupler 20 to the ring resonators 12, 26 is subsequently coupled from the ring resonators 12, 26 to the waveguide core 60 and absorbed by the absorber 64. Similarly, light that is coupled from the edge coupler 20 to the ring resonators 14, 28 is subsequently coupled from the ring resonators 14, 28 to the waveguide core 62 and absorbed by the absorber 66.

Figure 8:
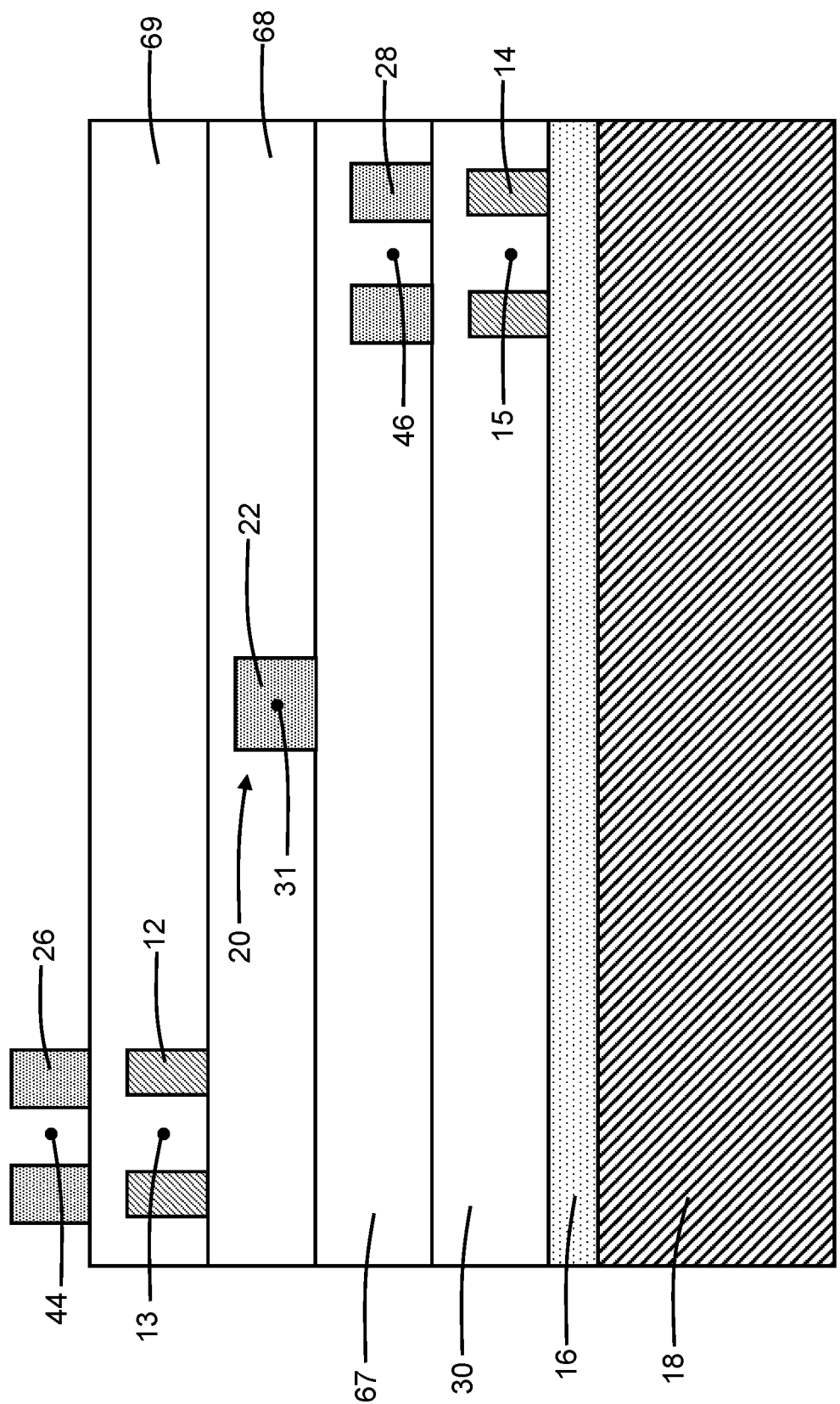
FIG. 8 is a cross-sectional view of a structure in accordance with alternative embodiments of the invention.

With reference to FIG. 8 and in accordance with alternative embodiments of the invention, the structure 10 may be modified such that the stacked ring resonators 12, 26 are positioned in respective levels above the edge coupler 20 and the stacked ring resonators 14, 28 are positioned in respective levels below the edge coupler 20 in a multi-level arrangement. The result is that the edge coupler 20 is positioned in a vertical direction (i.e., in elevation) in a level between the levels including the ring resonators 12, 26 and the levels including the ring resonators 14, 28. Additional dielectric layers 67, 68, 69 comprised of a dielectric material, such as silicon dioxide, may be added in order to form the ring resonators 12, 26 above the edge coupler 20 and the ring resonators 14, 28 below the edge coupler 20. The ring resonators 12, 26 may be diagonally offset to one side of the edge coupler 20, and the ring resonators 14, 28 may be diagonally offset to an opposite side of the edge coupler 20. In alternative embodiments, the edge coupler 20 may include additional waveguide core sections that are arranged in a level between the edge coupler 20 and the ring resonator 26, a level between the edge coupler 20 and the ring resonator 12, and/or in the same level as the edge coupler 20.

Figure 9:
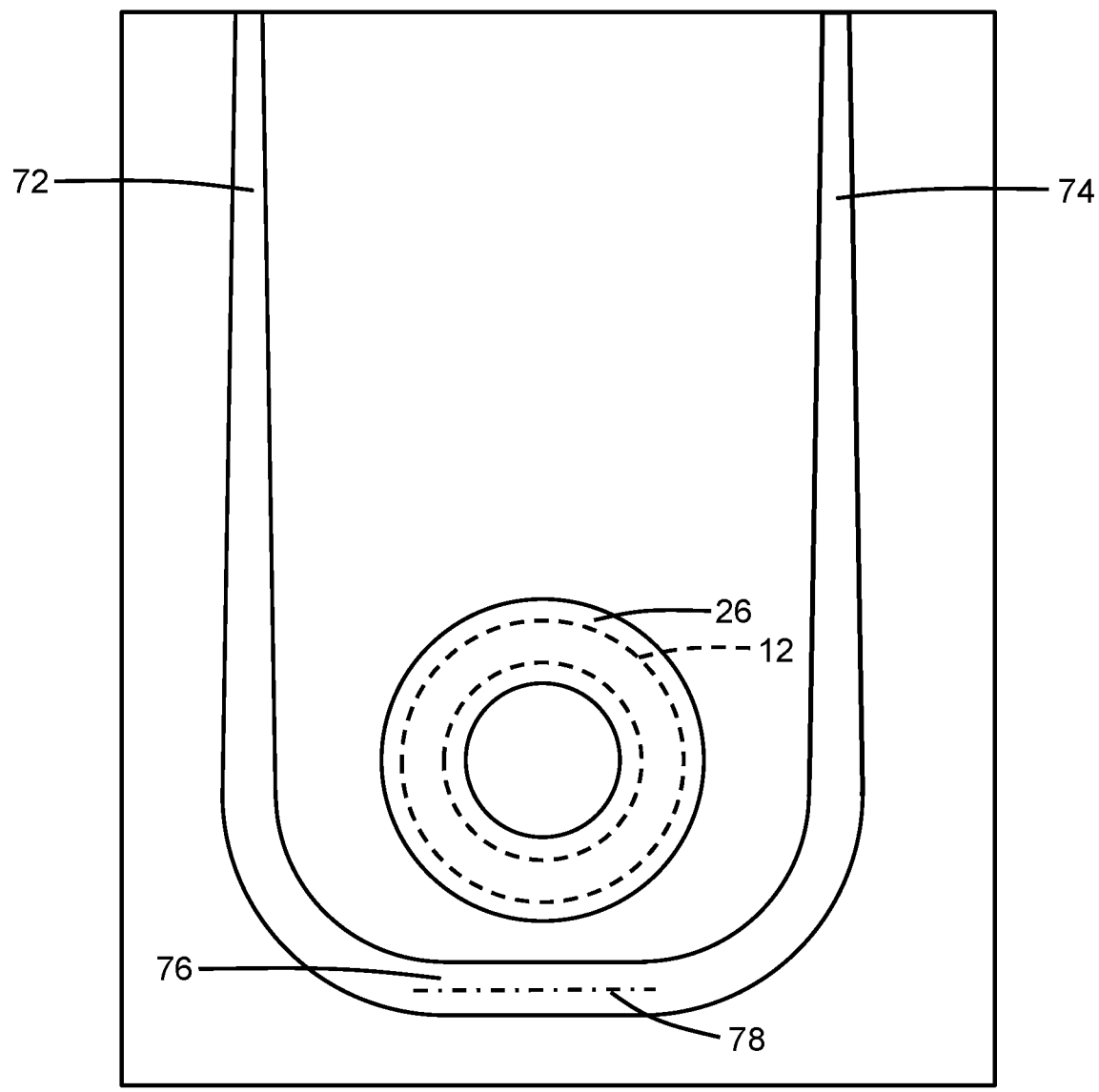
FIG. 9 is a top view of a structure in accordance with alternative embodiments of the invention.

With reference to FIG. 9 and in accordance with alternative embodiments of the invention, a structure 70 may include an edge coupler 72, an edge coupler 74, an optical component in the form of a waveguide core 76 connecting the edge coupler 72 with the edge coupler 74, and stacked ring resonators 12, 26 that are positioned adjacent to a portion of the waveguide core 76. The portion of the waveguide core 76 adjacent to the stacked ring resonators 12, 26 may be aligned along a longitudinal axis 78, and the stacked ring resonators 12, 26 may be spaced in a lateral direction from the longitudinal axis 78. The spacing between the stacked ring resonators 12, 26 is selected to ensure weak optical coupling of light from the waveguide core 76 to the stacked ring resonators 12, 26 as described above.

In the representative embodiment, the edge couplers 72, 74 and the waveguide core 76 are positioned in same level as the ring resonator 26, and the ring resonator 12 is positioned in a vertical direction between the ring resonator 26 and the substrate 18. In an alternative embodiment, the edge couplers 72, 74 and the waveguide core 76 may be positioned in same level as the ring resonator 12, and the ring resonator 12 may be positioned in a vertical direction between the ring resonator 26 and the substrate 18.

Light received by the edge coupler 72 from, for example, an optical fiber is guided by the waveguide core 76 to the edge coupler 74 for coupling to, for example, another optical fiber. A small portion of the light propagating in the waveguide core 76 will be coupled into the stacked ring resonators 12, 26, which permits light of the transverse electric polarization to be distinguished from light of the transverse magnetic polarization as described above.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first edge coupler having a longitudinal axis, the first edge coupler comprising a plurality of segments aligned along the longitudinal axis, the first edge coupler terminated by one of the segments at a facet, the plurality of segments having respective width dimensions that increase with increasing distance from the facet, and the first edge coupler configured to receive light at the facet;
a first ring resonator positioned adjacent to the first edge coupler, the first ring resonator spaced in a lateral direction from the longitudinal axis of the first edge coupler by a first distance;
a second ring resonator spaced in a vertical direction from the first ring resonator, the second ring resonator having an overlapping relationship with the first ring resonator;
a third ring resonator positioned adjacent to the first edge coupler; and
a fourth ring resonator spaced in the vertical direction from the third ring resonator, the fourth ring resonator having an overlapping relationship with the third ring resonator, and the fourth ring resonator spaced in the lateral direction from the longitudinal axis of the first edge coupler by a second distance,
wherein the first edge coupler is positioned in the lateral direction between the first ring resonator and the third ring resonator, the first ring resonator and the second ring resonator are concentric, and the third ring resonator and the fourth ring resonator are concentric.

2. The structure of claim 1 wherein the first ring resonator comprises a first material, and the second ring resonator comprises a second material different from the first material.

3. The structure of claim 1 wherein the first ring resonator comprises a material, and the second ring resonator comprises the material.

4. The structure of claim 1 wherein the second ring resonator is spaced in the vertical direction from the first ring resonator by a third distance.

5. The structure of claim 1 wherein the first distance and the second distance are equal.

6. The structure of claim 1 wherein the second ring resonator is spaced in the vertical direction from the first ring resonator by a third distance, and the fourth ring resonator is spaced in the vertical direction from the third ring resonator by a fourth distance.

7. The structure of claim 1 wherein the first distance is selected to provide weak coupling between the first edge coupler and the first ring resonator.

8. The structure of claim 1 further comprising:
a waveguide core including a light absorber,
wherein the first ring resonator is positioned adjacent to the waveguide core.

9. The structure of claim 1 wherein the first ring resonator is an annular waveguide core centered about a center point.

10. The structure of claim 1 wherein the first ring resonator is a racetrack waveguide core centered about a center point.

11. The structure of claim 1 further comprising:
a waveguide core; and
a second edge coupler that is coupled by the waveguide core to the first edge coupler.

12. The structure of claim 1 wherein the first ring resonator, the second ring resonator, and the first edge coupler comprise silicon nitride.

13. The structure of claim 1 wherein the first ring resonator comprises a semiconductor material, and the second ring resonator and the first edge coupler comprise silicon nitride.

14. The structure of claim 1 further comprising:
a light source positioned adjacent to the first edge coupler, the light source configured to supply the light to the first edge coupler.

15. The structure of claim 14 wherein the first distance and the second distance are selected such that one percent or less of the light is coupled from the first edge coupler to the first ring resonator, the second ring resonator, the third ring resonator, and the fourth ring resonator.

16. The structure of claim 15 wherein the light is coupled from the first edge coupler to the first ring resonator, the second ring resonator, the third ring resonator, and the fourth ring resonator provides a perturbation that permits a polarization mode of the light received by the first edge coupler to be distinguished.

17. The structure of claim 15 wherein one percent or less of the light is coupled from the first edge coupler to the first ring resonator, the second ring resonator, the third ring resonator, and the fourth ring resonator.

18. The structure of claim 1 wherein the plurality of segments are separated by gaps that are filled by a dielectric material to provide a metamaterial structure.

19. The structure of claim 1 wherein the plurality of segments number three or more.

20. A method comprising:
forming an edge coupler having a longitudinal axis, wherein the edge coupler comprises a plurality of segments aligned along the longitudinal axis, the edge coupler is by one of the segments terminated by one of the segments at a facet, the plurality of segments have respective width dimensions that increase with increasing distance from the facet, and the edge coupler is configured to receive light at the facet;
forming a first ring resonator positioned adjacent to the edge coupler, wherein the first ring resonator is spaced in a lateral direction from the longitudinal axis of the edge coupler by a first distance;
forming a second ring resonator spaced in a vertical direction from the first ring resonator, wherein the first ring resonator and the second ring resonator are formed with an overlapping relationship, and the first ring resonator and the second ring resonator are concentric;
forming a third ring resonator positioned adjacent to the edge coupler; and
forming a fourth ring resonator spaced in the vertical direction from the third ring resonator, wherein the fourth ring resonator has an overlapping relationship with the third ring resonator, and the fourth ring resonator spaced in the lateral direction from the longitudinal axis of the edge coupler by a second distance, and
wherein the edge coupler is positioned in the lateral direction between the first ring resonator and the third ring resonator, the first ring resonator and the second ring resonator are concentric, and the third ring resonator and the fourth ring resonator are concentric.

* * * * *